United States Patent [19]

Ferrara

[11] Patent Number: 5,680,204
[45] Date of Patent: Oct. 21, 1997

[54] DUAL SCANNING ELECTRONIC REPROGRAPHIC DOCUMENT HANDLER

[75] Inventor: Joseph J. Ferrara, Webster, N.Y.

[73] Assignee: Xerox Corporation, Stamford, Conn.

[21] Appl. No.: 321,509

[22] Filed: Oct. 12, 1994

[51] Int. Cl.⁶ ................................................ G03G 15/00
[52] U.S. Cl. ......................... 355/311; 355/75; 355/231
[58] Field of Search .................................... 355/231, 308, 355/311, 313, 233–235, 75, 23, 25, 309; 271/3.1, 291; 358/474

[56] References Cited

U.S. PATENT DOCUMENTS

| | | | |
|---|---|---|---|
| 4,247,192 | 1/1981 | Komori et al. | |
| 4,743,974 | 5/1988 | Lockwood | 358/285 |
| 4,803,519 | 2/1989 | Asada et al. | |
| 4,853,746 | 8/1989 | Giannetti et al. | |
| 4,925,176 | 5/1990 | Acquaviva | 271/3.1 |
| 4,967,233 | 10/1990 | Buchar et al. | 355/233 |
| 5,280,368 | 1/1994 | Fullerton | 358/474 |

FOREIGN PATENT DOCUMENTS 57-88462  11/1980  Japan.

*Primary Examiner*—Thu Anh Dang
*Attorney, Agent, or Firm*—Oliff & Berridge

[57] ABSTRACT

An automatic document handler includes a compact document handling system capable of automatically feeding cut sheet documents and computer form documents to a pair of scanner arrays arranged on opposite sides of a curvilinear document transport path. The document handling system includes a constant velocity transport comprising at least a roller pair located along a curved portion of the curvilinear transport path to eliminate interference between a sliding scanner array and document feed rollers. The document handler scans originals without transporting them over the platen and the platen cover serves as an input tray for computer form original documents.

21 Claims, 3 Drawing Sheets

DUAL SCANNING ELECTRONIC REPROGRAPHIC DOCUMENT HANDLER

BACKGROUND OF THE INVENTION

1. Field of the Invention

This invention relates to copying machines, and more particularly to a copying machine having an array of image scanning sensors suitable for scanning documents presented on a scanning platen or moved past the array.

2. Description of Related Art

As an adjunct to electronic document production, it has become desirable to acquire information for electronic processing applications directly from printed original documents. An important reason for its desirability is the subsequent capability to manipulate the electronically stored information for editing, compiling and using information in forms other than that in which it was originally available. Accordingly, it is desirable to have an image information input capability for such information.

In addition to the production of new documents from electronically stored information, it will also be appreciated that some copying functions available in light lens-type copiers may be more readily accomplished if image information is available electronically. Thus, with the capability of electronic input of information, coupled with available output devices, functions such as duplex copying, image rotation, cropping, editing, etc., are possible without the requirement of difficult mechanical manipulation of originals and copies.

In view of the above factors, it has become desirable to provide arrangements for faster document handling, particularly adapted to applications of raster input scanners. It is particularly desirable to provide a scanning device for scanning duplex documents, i.e., original documents having image information on both sides, for simplex documents having information only on a single side, and for material not adapted to be passed through sheet handling devices. In the past, this feature has been approached in raster input scanners in a variety of ways. As shown in U.S. Pat. No. 4,536,077 to Stoffel, an arrangement is provided with an optical system to direct light reflected from a first side of the document to a single scanning array, while the document is moving past a first position, and subsequently directing light from the second side of the document to the scanning array when it has reached a second position. The arrangement does not optimally simultaneously scan both sides of the document, requires expensive optical arrangements to transmit the image optically to the single sensor, and allows the operation of only the single sensor during a selected period of time.

As shown in U.S. Pat. 4,247,192 to Komori, an arrangement is provided with an optical system in which book-like documents and cut-sheet documents can be copied. This system requires an expensive and complicated lens system that is selectively switched when copying in the book-like mode and the cut sheet mode. When in the cutsheet mode, both simplex and duplex type copying can be performed, but this requires both a simplex output tray and a duplex output tray in order to properly orient the original documents to their initial sequence. When copying in the duplex mode, in addition to shifting the book/cut-sheet mirror, a second shifting mirror is required to redirect reflected light to the second side of the document for copying. In addition, devices such as disclosed by Komori require at least one pair of reversible rollers so that a first side of a document is subject to a reflected light of a first orientation, the original document is reversed, and the second side of the original document is subject to reflected light beams having a second orientation. Again, the arrangement does not optimally simultaneously scan both sides of the document, requires expensive optical arrangements to transmit the image optically to the single sensor, and allows the operation of only a single sensor during a selected period of time. In addition, this copying machine is not capable of automatically copying original documents in the form of continuous form paper, irregularly sized paper or irregularly weighted paper.

As shown in U.S. Pat. No. 4,803,519 to Asada et al., book-like documents can be manually copied and sheetlike documents can be automatically copied using a mode selection switch. There is no provision, however, for duplex copying or for copying of continuous computer forms or irregularly weighted paper. In addition, Asada requires a complicated lens and mirror system like Komori and Stoffel.

To eliminate the need for complicated lens and mirror systems, the prior art has proposed the use of scanning arrays. Scanning arrays, i.e., linear or two dimensional arrays of semiconductor elements suitable for detection of light from an illuminated image, have been limited in size by an inability to manufacture sizable links thereof. This requires optical magnification and focusing elements to derive an image from a document suitable for detection by the sensors of the scanning array. It is often necessary to provide overlapping links of small sensor arrays to build longer links to accommodate document scanning. While these scanning arrays have had some success, they require extensive manipulation to provide a correct output image, resulting in slower data or image acquisition rates. Initially having a slow rate of data acquisition, recent scanning arrays have become available that include a linear array extending the full width of the document. These arrays may be used to scan a document with a single pass, without magnification or optical software manipulation of the image to accommodate the size of the scanning array, or software manipulation of images from overlapping arrays. These arrays are also improving in speed of image acquisition so that less time is required for each sensor to derive sufficient light information about a given image point, and transfer of the information to an electronic data processor. Such arrays and their benefits over previous types of sensor arrays are described in U.S. Pat. No. 4,604,161 to Araghi. In addition, a disclosure entitled "Automatic Duplex Document Electronic Scanning" by Richard E. Smith, and published at Xerox Disclosure Journal, Vol. 8, No. 3, May/June 1983 at page 263, demonstrates both side scanning of a document with two spaced apart scanning arrays arranged on opposite sides of a document path, and platen scanning by a movable carriage supporting one of the arrays. This arrangement requires multiple scanning positions and document advancing through the scanning areas at significant expense.

Still further, U.S. Pat. No. 4,743,974 to Lockwood proposes a copying machine capable of copying in three modes; book-like copying mode, cut sheet document mode; and semiautomatic document feeding (SADH) mode. For the second and third modes, original documents are fed using a constant velocity transport, mounted within the cover of the copier, and having two idling and feeding roller pairs. A pair of sensor arrays is located between the rollers for scanning in a simplex mode or a duplex mode. In addition, the bottom scanner is mounted on the linear track and is movable to a position that is capable of scanning book-like documents. Because cut sheet documents are scanned on either one or both sides with a single pass, the original documents will be transported to output tray 102 in an orientation that is the same as the orientation of the documents when placed in the input tray. In Lockwood, however, for copying in the book-like mode, the platen cover that contains the entire automatic document handling assembly for cut sheet documents must be raised. In addition, when moving the lower scanner to the book-like copying mode, it is necessary to move the downstream drive roller pair so that the sliding linear scanner array can pass without interference. Alternatively, it is necessary to move the lower scanning array to a lower level than the idler roll in order to prevent interference. In addition, the device of Lockwood requires three sets of exit roller nip pairs in order to transport a scanned document from the constant velocity transport to the output tray. Even further, in the SADH and the cut sheet feeding modes, the device of Lockwood requires that the original documents be transported over the platen before scanning. All patents and publications cited above are herein incorporated herein by reference.

SUMMARY OF THE INVENTION

It is therefore an object of the invention to provide a raster input scanner suitable for scanning simplex or duplex documents fed from a stack or placed on a scanning platen.

It is another object of the invention to provide a raster input scanner having good reliability.

It is another object of the invention to provide a raster input scanner having reduced cost.

It is another object of the invention to provide a raster input scanner having compact size.

It is another object of the invention to provide a raster input scanner having a high reliability and compact size that maintains all desirable copying features in an improved architectural arrangement.

In accordance with one aspect of the invention, there is provided an automatic document handler that includes a platen for photocopying book-like original documents; a platen cover pivotally engageable with the platen and movable between an open and closed position; and a dual mode document handler for feeding original documents in first and second modes. For feeding cut sheet documents, the dual mode document handler includes an input tray for feeding the cut sheet documents to an off-platen scanner and an output tray for receiving the cut sheet documents discharged from the off-platen scanner. In addition, the dual mode document handler includes an inlet for feeding documents such as computer forms in a second mode to the off-platen scanner.

In accordance with another aspect of the invention, there is provided an automatic document handler comprising a document handling system capable of automatically feeding at least cut sheet documents and computer form documents to a pair of scanner arrays arranged on opposite sides of a curvilinear document transport path, the document handling system including a constant velocity transport including at least a roller pair located along a curved portion of the curvilinear transport path.

In accordance with still another aspect of the invention, there is provided an automatic document handler comprising a scanner module having platen, a document handler stationarily mounted on the scanner module, and a platen cover adjacent the document handler and pivotally mounted to the scanner module, the platen cover also including an input tray for feeding one of computer form original document and irregular weight documents to said document handler.

It is accordingly an advantage of the invention that the use of dual scanning elements each provided with a scanning array, arranged closely adjacent to one another and on either side of the document path, allows documents having image information on one or both sides to be fed through a sheet path to allow scanning and data acquisition from both sides of the document. Scanning of both faces of the document may be performed substantially simultaneously, allowing an extremely compact scanning station, scanning optics and paper path. The provision of a single scanning station allows the use of a single document transport arrangement for advancing documents through the scanning station.

It is another advantage of the invention that one of the same scanning elements is supported for movement across a scanning platen to provide scanning and data acquisition from originals where it is not desirable or possible to feed the original through the sheet feeding apparatus of the device. The movable scanning element will not interfere with the feed roller pair because the feed roller pair is located on an arcuate portion of a curvilinear transport path. The movable scanning element may integrally comprise sensors, light source and lens. The scanning element is useful for dual modes of operation.

It is another advantage of the invention that the document handler is stationarily mounted with respect to the pivotally mounted platen. With this structure, lifting of the platen cover does not require much force because the document handling system is not located within the platen cover, as is common in most prior art devices. In addition, when the platen cover is in the closed position facing the platen, the top portion of the platen cover serves as an input tray for continuous form documents. Neither cut sheet documents or continuous form documents are transported along the platen, which cuts down on the overall length of the transport path, thereby reducing the drive forces required to transport paper, i.e., the present system need not overcome frictional forces produced between the platen and paper as is the case in conventional copying machines. Moreover, the size of the paper driving motor can be reduced. In addition, the reduced transport path provides for rapid copying, compact size, and eliminates the need for complicated registration assembly because documents traveling along a short transport path are less inclined to become misregistered.

BRIEF DESCRIPTION OF THE DRAWINGS

The invention will be described in detail with reference to the following drawings wherein.

DETAILED DESCRIPTION OF PREFERRED EMBODIMENTS

Figure 1:
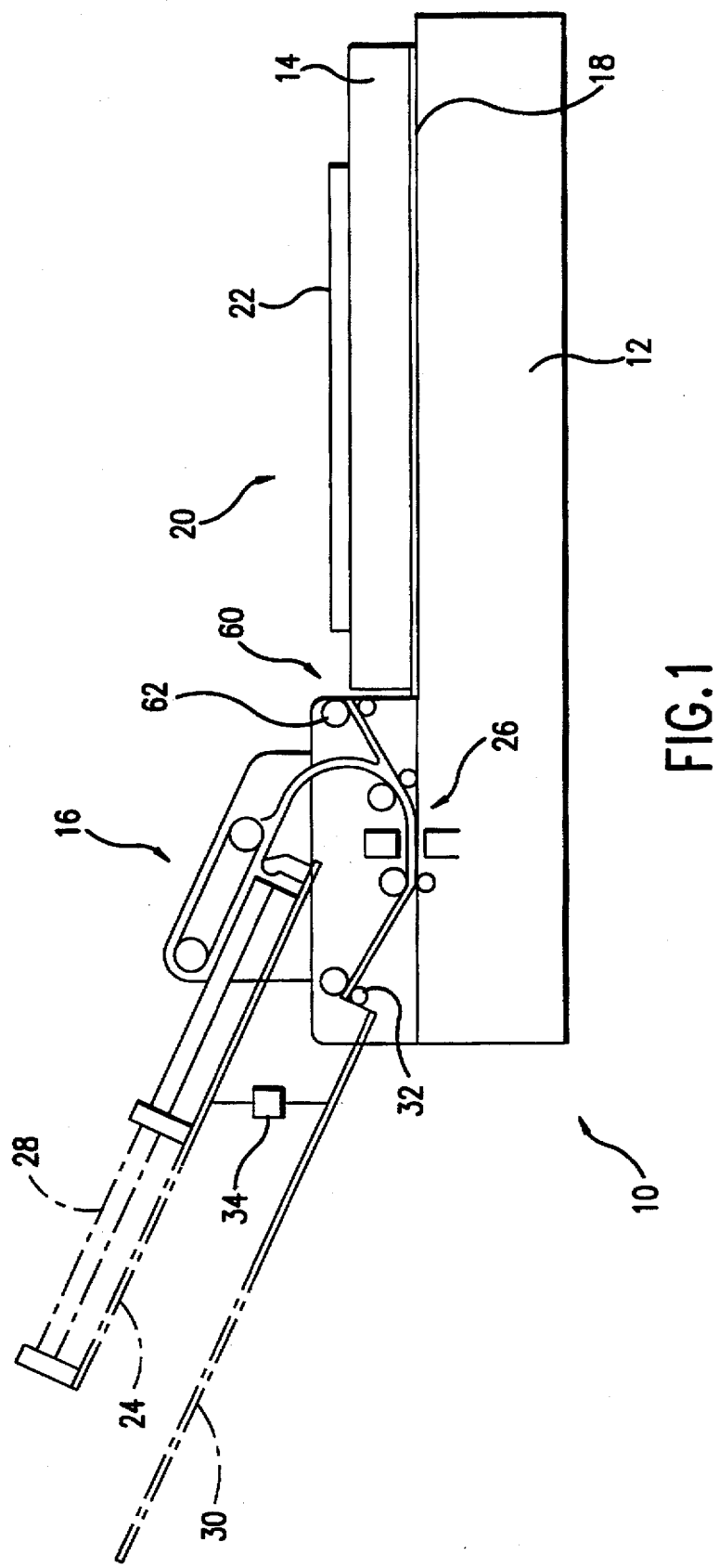
FIG. 1 is a schematic view of a raster scanning input device in accordance with the present invention showing the overall architecture of the device.

FIG. 1 shows an automatic document handler 10 in accordance with the invention for generating an electronic representation of an image on a document. As used hereinafter, "document" refers to an image bearing original from which copying is desired. Documents may comprise image supporting substrates, such as cut sheets of paper, transparencies or other individual pieces of sheet-like material, unburst computer forms forming a continuous length of material or any image bearing substrate, such as a book, from which copying is desired. When necessary, the type of document will be described with greater particularity. "Image" as used herein refers to the information on the document that will be copied to another substrate or to an electronic storage medium. "Scanning" refers to the relative movement of photosensitive sensors with respect to documents for the purpose of acquiring an electronic representation of the image or information about the image.

The automatic document handler 10 is comprised of a scanner module 12, a platen cover 14 and a dual mode document handler 16. The platen cover 14 is pivotably engageable and attached to scanner module 12 and includes a bottom surface that faces a platen 18 in a closed position and a top surface, opposite the bottom surface, that includes a tray 20 for handling documents in a semiautomatic document handling (SADH) mode in which computer form paper, irregular weighted and irregularly sized original documents may be copied.

The dual mode document handler 16 includes a tray 24 for feeding cut sheets and is preferably a downhill top vacuum corrugated feeder (TVCF). Downhill feeding allows intermixed original document feeding capability. The present invention is adaptable for use with state of the art TVCF technology and low cost, low power and low noise TVCF systems that are currently being researched and developed. The first input tray 24 is angled at approximately 25° in the downhill direction for allowing intermixed document feeding. The capacity of the first input tray 24 is about 100 documents. The input tray is extendible (as indicated by the dashed lines), using conventional mechanisms, such as friction bearings, channels, etc., to hold larger paper sizes when needed, but will normally give the appearance of a small tray. Also included in the dual mode document handler 16 is a constant velocity transport 26 to be explained in more detail below. The cut sheets are transported to an exit feed tray 30 upon exiting from the constant velocity transport 26. The exit feed tray or restack 30 includes a single corrugated output nip 32 and is oriented at about 25° in the uphill direction parallel to the input paper stack 28. The uphill restack tray 30 fits under the downhill feeder tray 28 and is similarly extendible for larger sheets, but normally gives a small appearance. For ease of operation, the two tray extensions of trays 24 and 30 may be attached together using a conventional mechanism, such as a link 34 for simultaneously adjusting the size and/or orientation of the trays.

Figure 2:
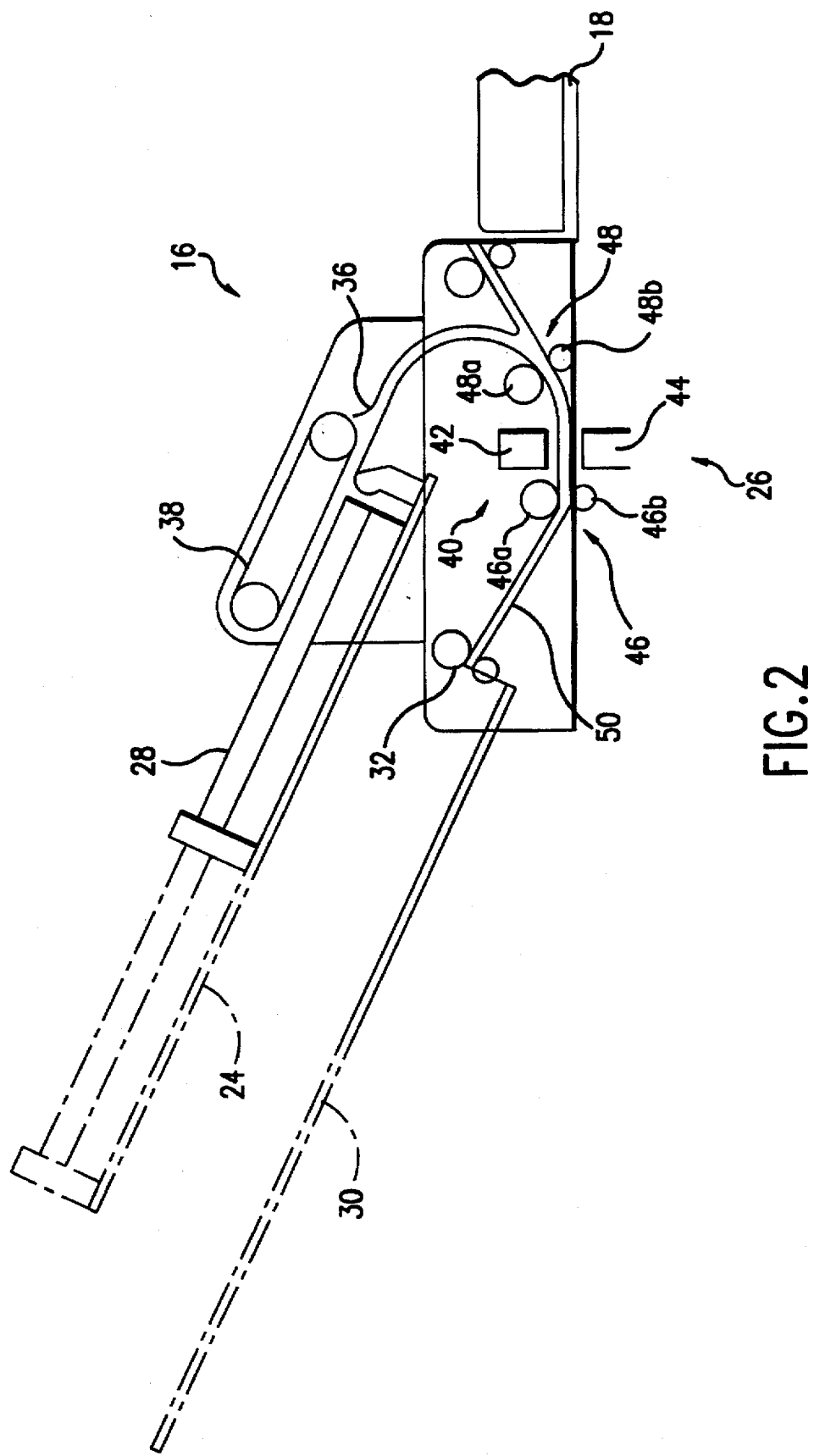
FIG. 2 is an enlarged section showing the details of the dual mode document handling system.

The dual mode document handler 16 including the constant velocity transport and its associated cut sheet input and output trays is stationarily mounted on scanner module 12 adjacent pivotable cover 14. As is more clearly visible in FIG. 2, the dual mode document handler 16 includes a sheet path 36 along which cut sheet documents 28 are transported to the scanning station 40 and eventually into paper restack 30. A cut sheet document transport belt 38 extends along path 36 to individually and singly transport documents 28 from the input stack 28 to path 36. Path 36 is a curvilinear path and guides cut sheet documents to the scanning station 40.

The scanning station 40 comprises upper and lower scanning elements 42 and 44. The upper scanning element 42 is fixed in position with respect to the sheet path 36. Details for the upper scanner 42 can be found in U.S. Pat. No. 4,743,974 to Lockwood, incorporated herein by reference. The scanning element 42 includes a scanning array (not shown) that may include a linear array of photosensitive sensors such as CCD's or photodiodes that are controlled to sense light reflected from a document during an integration period. The photosensitive sensors develop a charge indicative of the amount of light detected, for transmission to an image processor for use in assimilating an electronically stored representation of the image on the document.

Documents directed past scanning station 40 are illuminated by a lamp assembly (not shown). Light from the illuminated document may be reflected through a lens that directs light reflected from the document to the scanning array. It will of course be appreciated that other optical and illuminating systems may be used to illuminate and direct light from the document to the scanning array.

Lower scanning element 44 is provided as a mirror image of scanning element 42 and includes a scanning array and lamp assembly (not shown). The primary difference between the two scanning elements is that the lower scanning element 44 is arranged in a position opposing the upper scanning element 42, in order to scan images on a side of a document opposite to that scanned by the upper scanning element 42. Accordingly, images on the upper face of documents, passing through the scanning station 40, are illuminated and scanned by upper scanning element 42, while images on the lower face of the document are illuminated and scanned by the lower scanning element 44. In practice, it is preferable to have the elements slightly offset from one another so that the illumination provided for scanning one side of the document does not cause shadows detectable by the sensors on the other side of the document.

Documents entering the scanning station 40 are driven into and through the station by a four-roll controlled velocity transport (CVT) 26 comprising two sets of nip roller pairs 46 and 48 located at the entry and exit of the scanning station, respectively. Each nip roller pair includes an upper drive roll 46a and 48a and a lower idler roll 46b and 48b. Drive rolls 46a and 48a are driven by a motor (not shown) that maintains the speed of the rolls and accordingly controls the speed of documents moved by the rolls to a carefully controlled constant velocity. Speed variation should generally be avoided to maintain optimum image quality. The sensors forming the scanning arrays of the upper and lower scanning elements are extremely small, and minor movement variations will alter detection of the image. The rollers comprising the CVT may be supported separately from the scanning elements 42 and 44. With reference to FIG. 1, original documents transported to the scanning station 40 are directed between scanning element 42 and 44 using CVT 26. Cut sheet documents from the first input tray 24 and/or continuous form documents from the second input tray 20 do not contact platen 18 during copying. Accordingly, the dual mode document handler 16 can be described as an offplaten document handling and copying apparatus. With such an arrangement, maximum throughput speed for processing documents can be obtained. Moreover, because the scanning elements are stationary, there is no loss of processing speed due to rescanning or reciprocating the scanning element back and forth over each document. As such, there is also no need to compensate for quickly accelerating and decelerating parts, the motors associated with these movements, or the brakes and/or stopping mechanisms required to effectively control the processing operation. The only down time of the present invention results from the time it takes to move subsequent documents into a scanning position, and the space between adjacent documents. The improvement in down time and elimination of moving parts contribute to the overall efficiency and reliability of the system.

As documents are advanced through scanning station 40, photosensitive sensors on scanning arrays of the scanning element 42 and 44 are repeatedly exposed to light reflected from a document to derive an electronic representation of the image thereon for transmission to an image processing or storage device. In a preferred embodiment of the invention, for duplex documents, image information from each side of the document is derived and transmitted alternately by each respective array. Thus, for example, while the array of scanning element 42 is deriving image information, the array of scanning element 44 may be transferring previously derived image information out of the array. Upon leaving the scanning station 40, documents are driven by CVT 26 to an exit sheet path 50 (FIG. 2) where documents are driven by the single nip roller pair 32. The passage of documents along the described sheet path, having a generally U-shape, and feeding the documents in the input tray 24 from the top of the input stack 28, provides a single natural inversion of the documents, so that they are arranged face down in output tray 30 in the same order they were originally provided. The provision of input stack 24 in close relation to output stack 30 in combination with the offplaten dual mode document handler provides for extremely short document travelling path. Accordingly, only a single nip pair 32 is required to transport the document from the CVT 26 to output paper tray 30. An additional advantage to this arrangement is that complex paper registration assemblies are not required. Rather, registration may be accomplished by simply using the tray because only a very short paper path is involved and thus there is less chance that documents will become misregistered.

Figure 3:
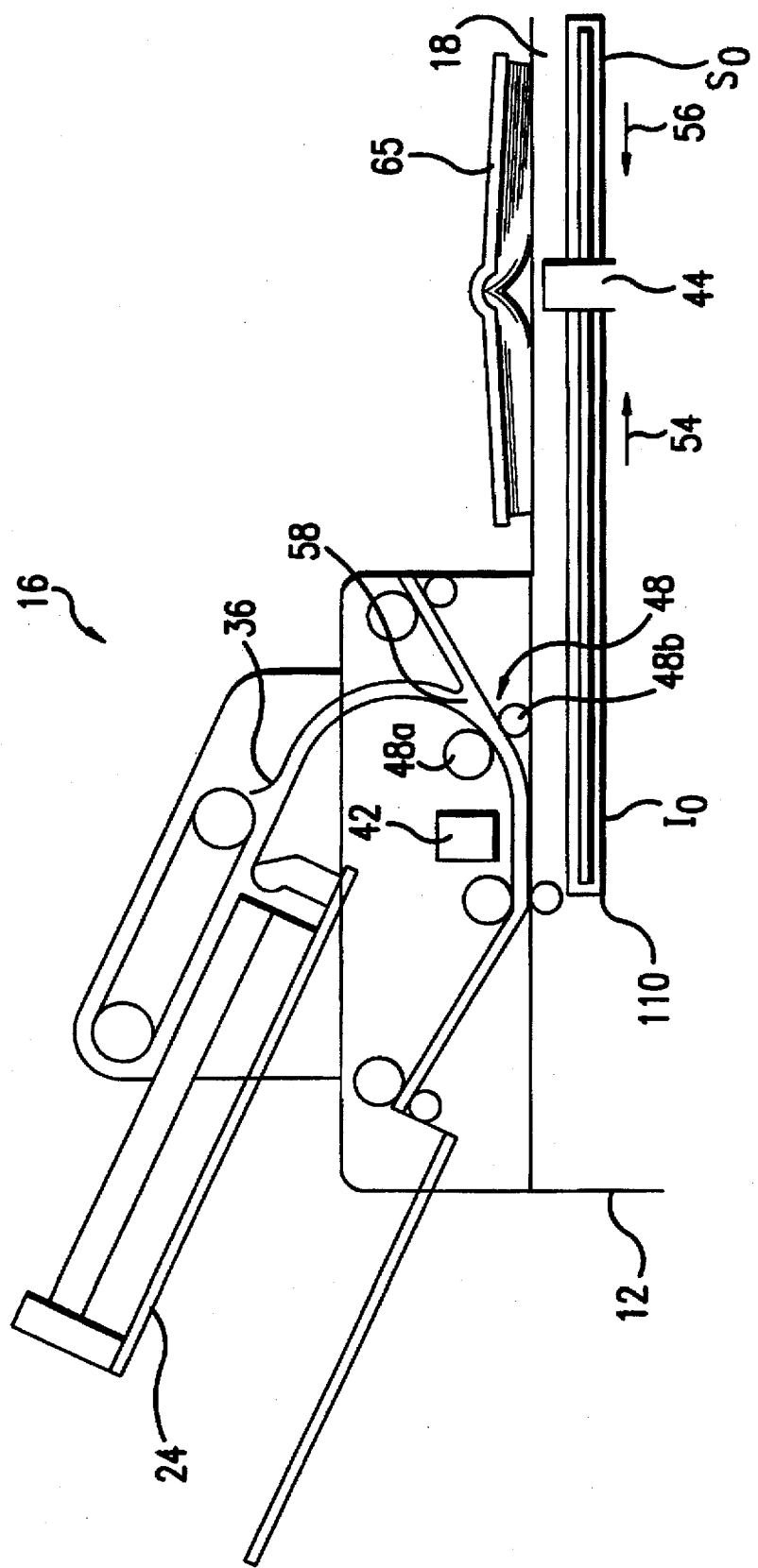
FIG. 3 is an enlarged section showing copying in the book-like copying mode.

Another aspect of the invention will be described with reference to FIG. 3. Cover member 14 is raised away from its position with respect to the scanner module 12, and therefore is not shown. Lower scanning element 44, normally arranged closely adjacent to scanner element 42 (FIG. 2), is also supported for reciprocating scanning movement, on support rail 110. Support rail 110 is provided in the scanner module 12, parallel to the direction of document travel within the dual mode document handler 16 and scanning station 40, and located, in a preferred embodiment, generally on the lower side of the path of sheet travel. In FIG. 3, only a single support rail 110 is shown, but usually at least two will be provided. Scanning element 44 may be provided with bearings or bushings to reduce sliding friction between scanning element 44 and the rail 110. Rail 110 supports the scanning element 44 for movement across a length of the scanner module 12 slightly below the scanning platen 18. Scanning platen 18 is a generally rectangular member having a size allowing the placement of documents thereon for scanning by the scanning element 44 as it moves across the length of the scanner module 12. The scanning platen 18 is supported at its edges on scanner module 12 and supports documents not readily fed from document input stack 24, such as pages of a book 65, single sheet unbound documents, documents too thick, fragile or damaged to be fed along paper path 36, or objects having surfaces, or profiles desired to be copied. On selection of platen copying, i.e., copying of images from documents placed on scanner platen 18, lower scanning element 44 moves from an initial position $I_O$ fixed with respect to upper scanning element 42 across the length of scanner module 12 and scanning platen 18 in the direction of arrow 54 to start of scan position $S_O$. The scanning array is generally inoperative for acquiring image data when moving in the direction of arrow 54, although it is well within the invention to either scan the document for image information, or to provide a pre-scan operation that allows a fast, gross scanning operation to derive an appropriate contrast level, or threshold information for use by the image processing device. Image scanning is preferably accomplished by movement of the lower scanning element from a position $S_O$ back to position $I_O$ in the direction indicated by the arrow 56.

Scanning element 44 is driven in its movement by any suitable drive arrangement (not shown) providing a very smooth, non-vibrating motion across the lower frame, such as, for example, a pulley and cable system, or a lead screw drive system. Various vibration damping arrangements may be provided to damp undesirable motion, such as bearings, bushings or cushions. In operation, the scanning element is driven from a position $S_O$ to position $I_O$. As the scanning element is moved across the platen 18, the sensors of the sensor array are repeatedly exposed to incremental slices of the document, producing charge information indicative of the image on a document for use in assembling an electronically stored image of the document. Desirable high speed movement of the scanning element requires that the frame member holding the lower scanning element 44 be relatively rigid to avoid bending under the stress of motion. It is also highly desirable to make the frame very light weight to allow high acceleration rates.

In continuing with the present invention, the arrangement as shown in FIG. 3 includes a pinch roller arrangement 48 including drive roller 48a and idler roller 48b. The positioning of the pinch roller assembly 48 is such that it is arranged about a curved part 58 of the curvilinear document path 36. Accordingly, movement of the lower scanning element 44 from its initial position $I_O$ to its start of scanning position $S_O$ is not inhibited by interference from drive roller 48a. Moreover, there is no need to move idler roller 48b out of the path of the sliding sensor 44 before the commencement of movement of lower scanning element 44 in the platen scanning mode. There is also no need to provide any movement of guide rail 110 or scanner element 44 when attempting to move the lower scanner element 44 in a direction shown by arrow 54 in FIG. 3. Overall, the lower scanning element 44 need only be made to be linearly translatable and roller pair 48 can be made to be mounted stationarily on the dual mode document handler 16, thereby increasing reliability. In prior art devices such as U.S. Pat. No. 4,743,974 to Lockwood, there was a requirement to move the driven roll 84b shown in FIG. 2 of that document in order to move the lower scanning element to the platen mode of copying.

In accordance with yet another aspect of the invention, FIG. 1 illustrates a semiautomatic document feeding mode, useful for feeding single documents or unburst computer form documents through the raster input scanner. In accordance with this aspect of the invention, an inlet 60 is provided in registration with a registration guide 22 of platen cover 14. The registration guide 22 may be coupled to the reprographic device such that the position of the registration guide provides input signals for the reprographic device as to proper sized copying documents. The registration guide 22 provides paper size input before the scanning operation is performed. Although the scanner is capable of determining paper sizes of documents during scanning, automatic size sensing for paper selection and automatic reduction and enlargement require input from paper guide 22 before scanning. An entrance nip 62 is provided adjacent the inlet 60 and is arranged to direct documents into the sheet path 36 to CVT 26 for feeding documents through scanning station 40 as previously described. As mentioned, the top of the platen cover 14 serves as a second input tray for the documents to be fed in to the SADH document feeding mode. Documents originating from second document input tray 20 will be directed to output or restack tray 30, as was the case with the cut sheet documents input from input tray 24.

Control of the described arrangement may be accomplished in a variety of ways, depending on the planned usage of the device. Feeding of documents, control of sheets directed through the sheet path, operation during the desired modes of operation, including movement of the scanning element 44 in its scanning motion across the platen may be controlled by an on-board microprocessor of the type commonly used in the control of light lens copiers, or prior raster scanners, and tailored to the application required by the present device. Control of the imaging assembly may also be an on-board microprocessor device that repeatedly polls the sensors of the sensor arrays located on sensor elements 42 and 44 to derive charge information indicative of the image on documents scanned. The microprocessor also assigns the derived data with address information and provides the addressed information as an output. The control of the device is responsive to operator information input. Alternatively, the described device may be partially or completely controlled by another device, such as, for example, a computer, a local or remote workstation or a compatible printer.

The invention has been described in detail with reference to preferred embodiments thereof, which are intended to be illustrative but not limiting. Various changes may be made without departing from the spirit and scope of the invention as defined in the appended claims.

What is claimed is:

1. An automatic document handler for a reprographic device capable of feeding a plurality of different sizes and types of original documents comprising:

a platen for photocopying book-like original documents;

a platen cover pivotably engageable with said platen and movable between an open position and a closed position;

an off-platen scanner capable of simultaneously scanning both sides of an original document independent of the position of the platen cover; and a dual mode document handler for feeding cut sheets in a first mode and one of computer form paper, irregular weighted original documents and irregularly sized original documents in a second mode; said dual mode document handler having a first input tray for feeding said cut sheet documents in said first mode to said off-platen scanner and an output tray for receiving said cut sheet documents discharged from said off-platen scanner, said dual mode document handler also including an inlet for feeding original documents in said second mode to said off-platen scanner.

2. The automatic document handler of claim 1, wherein said platen cover has a bottom surface that faces said platen in said closed position and a top surface opposite of said bottom surface, wherein said top surface includes a second input tray for holding original documents in said second mode near said dual mode document handler inlet.

3. The automatic document handler of claim 2 wherein said top surface and said inlet are registered when said platen cover is in said closed position.

4. The automatic document handler of claim 2, wherein said second input tray includes a guide member for registering said original documents with respect to said dual mode document handler.

5. The automatic document handler of claim 4, wherein said registration guide is coupled to said reprographic device so that the position of said registration guide provides input signals for said reprographic device as to properly sized copying documents.

6. The automatic document handler of claim 1, wherein said first input tray is a down hill top vacuum corrugated feeder.

7. The automatic document handler of claim 6, wherein said output tray is mounted directly on said dual mode document handler and is arranged parallel to said first input tray.

8. The automatic document handler of claim 7, wherein said output tray and said first input tray are inclined at approximately 25° relative to the platen.

9. The automatic document handler of claim 7, wherein said output tray comprises a single corrugated output nip roller pair.

10. The automatic document handler of claim 7, wherein said first input tray and said output tray are extendable to accommodate a variety of different sizes of original cut document sheets.

11. The automatic document feeder of claim 7, wherein said first input tray and said output tray are connected by at least one link member.

12. The automatic document handler of claim 1, wherein said off-platen scanner includes first and second scanning elements supported closely adjacent and opposite each other on opposite sides of a document path with said scanning elements supporting scanning arrays slightly offset from one another.

13. The automatic document handler of claim 12, wherein a selected one of said scanner arrays is movable across the platen to a position for scanning said book-like original documents.

14. The automatic document handler of claim 13, further comprising a constant velocity transport including an upstream roller pair and a downstream roller pair for feeding original documents in said first and second modes, said upstream roller pair being arranged on a curved portion of a curvilinear path such that the selected one of said scanner arrays is free to scan book-like original document.

15. The automatic document handler of claim 14, wherein said upstream roller pair is stationarily mounted on said dual mode document handler and said selected one of said scanner arrays is mounted on a linear track located below the upstream roller pair.

16. The automatic document handler of claim 10 wherein said off-platen scanner includes a constant velocity transport including two pairs of nip rollers for transporting original documents in said first mode and said second mode.

17. The automatic document handler of claim 16 wherein said off-platen scanner includes a curvilinear path for feeding said cut sheet original documents in said first mode to said constant velocity transport.

18. The automatic document handler of claim 1 wherein said off-platen scanner processes said original documents in said first and second modes without transporting said cut sheet original documents over said platen.

19. The automatic document handler of claim 1, further comprising a reprographic copier housing, said dual mode document handler being stationarily mounted on said housing and said platen cover being pivotably mounted to said housing.

20. An automatic document handler comprising a document handling system capable of automatically feeding at least one of cut sheet documents and computer form documents to a pair of scanner arrays arranged on opposite sides of a curvilinear document transport path, said document handling system including a constant velocity transport comprising at least a selected roller pair located along a curved portion of said curvilinear transport path, wherein a selected one of said scanner arrays is movable past the selected roller pair and across the platen to scan book-like documents, and wherein the selected scanner array moves without interference with the selected roller pair because the selected roller pair is located along the curved portion of the curvilinear path.

21. An automatic document handler comprising a scanner module having a platen, a document handler stationarily mounted on said scanner module, and a platen cover separate from and adjacent said document handler and pivotably mounted to said scanner module, said platen cover including an input tray for feeding one of computer form documents and irregular weight documents to said document handler.

* * * * *